3,434,735
TRAILER HITCH
Herbert J. Bernard, 8924 Lankershim Blvd.,
Sun Valley, Calif. 91352
Filed Mar. 20, 1967, Ser. No. 624,357
Int. Cl. B60d 1/12; B62d 53/00
U.S. Cl. 280—406                                  7 Claims

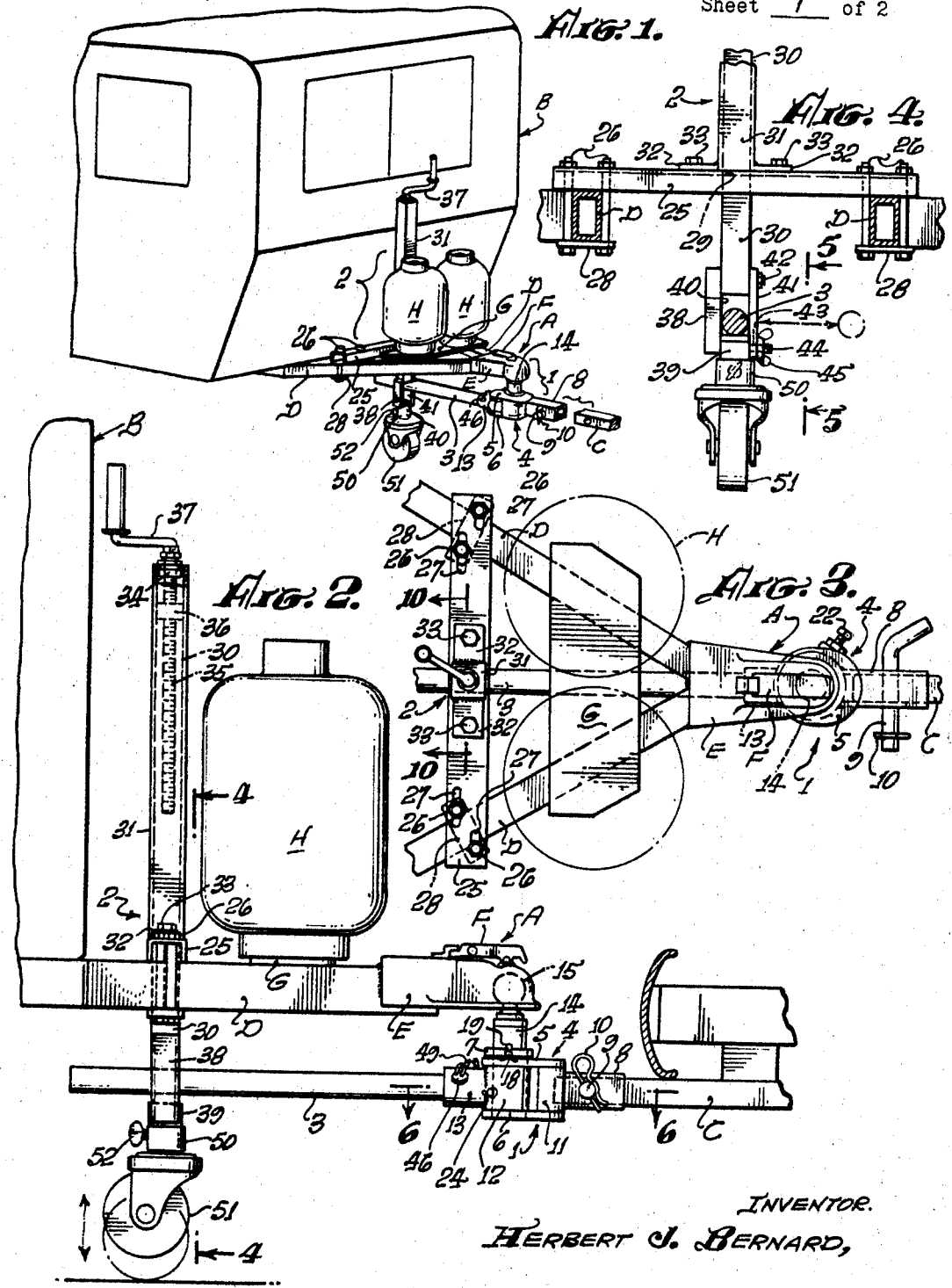

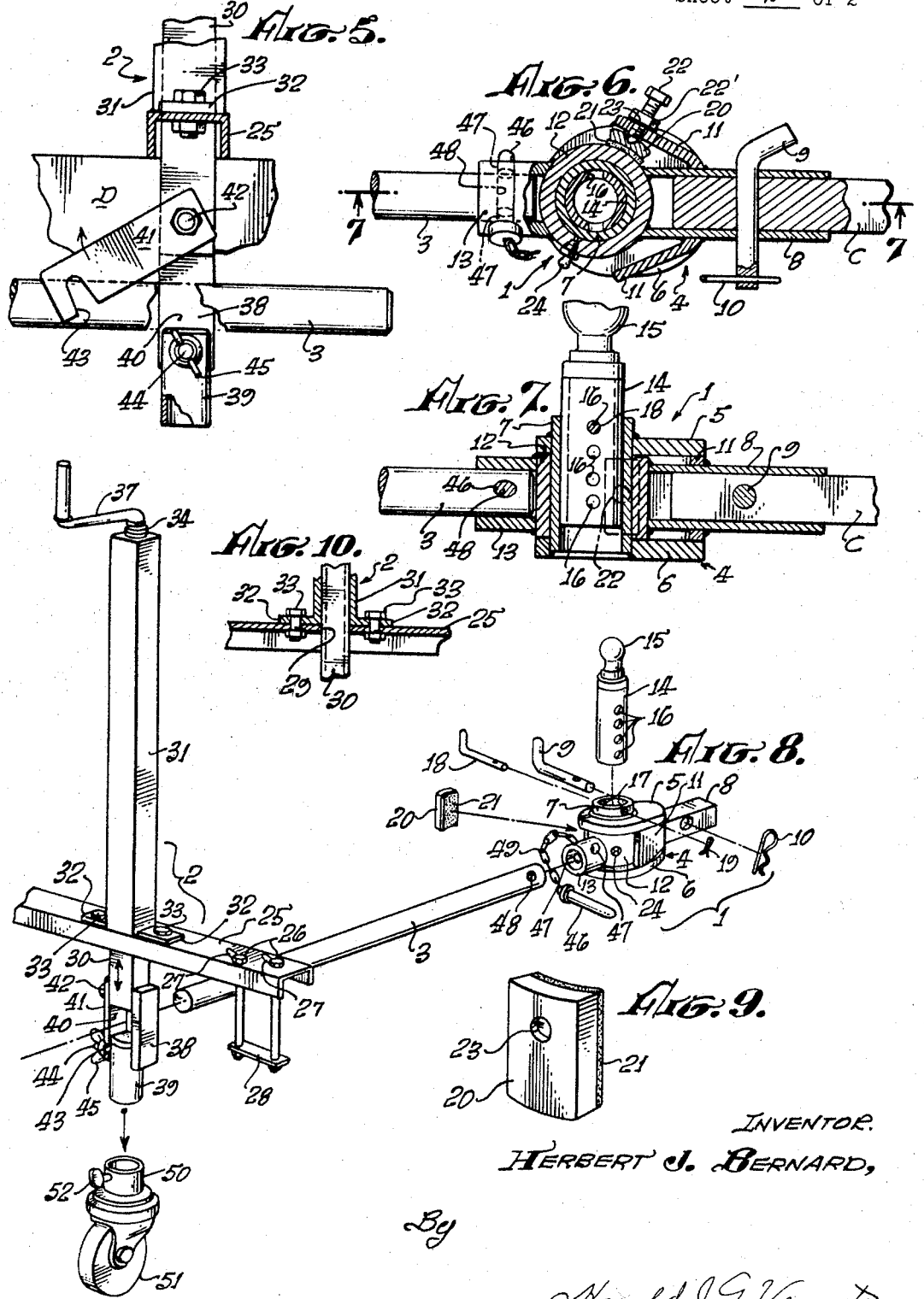

ABSTRACT OF THE DISCLOSURE

A trailer hitch means attachable to the tongue of a trailer for connection to a towing vehicle characterized by the inclusion therein of a friction means for resisting side sway, by vertically adjustable means employable optionally as a supporting jack for the front end of an uncoupled trailer or raising and lowering the trailer tongue incident to effecting connection to the towing vehicle, and by utilization of a portion of the side sway resisting means as a portion of a means for determining the proportion of the trailer weight to be imposed on the front end of the frame suspension means of the towing vehicle.

BACKGROUND OF THE INVENTION

Field of the invention

The towing of trailers imposes many problems, the most important of which are resisting side sway from cross winds, the proportioning of the weight imposed on the front wheels of the towing vehicle, and ease of coupling and uncoupling the trailer and towing vehicle. Of the many trailer hitch devices which are on the market, so far as is known, no one device successfully meets all of these problems.

Description of the prior art

Some house trailer hitches, as for example, those disclosed in Patents Nos. 2,898,124 and 3,129,957, of which applicant was a joint patentee, afford ease of coupling and uncoupling as well as adjustable means for varying the extent of trailer weight imposed on the front wheels of the towing vehicle, others may overcome sway but lack weight compensating means and still others may have advantages in sway resistance but are less easy to couple to and uncouple from a towing vehicle. Specifically all known prior art devices have undesirable limitations in one or more of these three essential characteristics.

SUMMARY OF THE INVENTION

With the foregoing considerations in mind, it is the principal object of the present invention to provide a trailer hitch means which is capable of detachable installation on a trailer tongue and which (a) includes a sway resisting means, (b) a load compensating or proportioning means, (c) an adjustable means for accommodating the height at which the connection to the ball carried by the towing vehicle is effected, (d) which can serve as the supporting jack when the trailer is disconnected from the towing vehicle and (e) which can be operated for connection with and disconnection from the towing vehicle entirely from the left hand side thereof whereby it is made more convenient for the driver of the towing vehicle to effect connection and disconnection with the trailer.

A further object of the invention is to provide a trailer hitch device in which the foregoing objectives are realized in practice, which is simple and sturdy in construction, economical to manufacture, which is simple to operate, and capable of application to a wide range of trailer tongue width dimensions.

With the foregoing objects in view, together with such additional objects and advantages as may subsequently appear, the invention resides in the parts, and in the construction, combination and arrangement of parts disclosed, by way of example, in the attached drawings showing a presently preferred embodiment of the invention.

BRIEF DESCRIPTION OF THE DRAWINGS

In the drawings:

FIG. 1 is a perspective view of the front end of a house trailer with the said presently preferred embodiment of the invention applied to the tongue thereof, the trailer being detached from the towing vehicle, FIG. 2 is an enlarged scale, side elevational view of the right hand side, having reference to FIG. 1, showing the attachment of the said preferred embodiment of the invention to a towing vehicle, FIG. 3 is a top plan view of FIG. 2, FIG. 4 is a fragmentary sectional view taken on the line 4—4 of FIG. 2, FIG. 5 is a fragmentary side elevation of the left hand side of the hitch means as indicated by the line 5—5 of FIG. 4, FIG. 6 is a fragmentary sectional view taken on the line 6—6 of FIG. 2, FIG. 7 is a fragmentary side elevational view taken in the plane of the line 7—7 of FIG. 6, FIG. 8 is an exploded view of the component parts of the invention, FIG. 9 is an enlarged perspective view of the friction producing member of the sway reducing means of the invention, and FIG. 10 is a fragmentary sectional view in a vertical plane containing the line 10—10 of FIG. 3.

DESCRIPTION OF THE PREFERRED EMBODIMENTS

Referring to the drawings, the device is shown in FIG. 1 as mounted on the tongue structure A of a house trailer B in close adjacency to the front wall of the trailer body and in FIGS. 2, 3 and 6 as being connected to a towing vehicle drawbar C projecting from the rear thereof. Having reference to FIG. 1, it will be noted that the device serves additionally as the tongue supporting jack means by which the trailer is disposed in a longitudinally level attitude when not connected to the towing vehicle. The manner in which this is accomplished will be described in detail as the description of the invention proceeds.

While house trailer tongue structures vary to some extent in various makes and models, they generally include forwardly converging members D, D extending from the trailer under frame structure and terminate at their forward apical end by being welded or otherwise connected to a head portion E having a socket which is open from the under side of said head portion for detachable engagement with a ball member forming a part of the trailer hitch and said head portion being provided with appropriate latch means for interlocking engagement with the ball received in the socket thereof as indicated at F. Usually, the tongue members D, D support a flatform member G on which may be mounted one or more butane or other fuel tanks H.

For convenience, the illustrated embodiment of the invention will be considered as comprising a connector component 1 and a jack component 2, the jack component being further regarded as including the horizontally extending bar 3 which engages both of said components. The connector component includes a ball supporting member 4 comprising spaced parallel upper and lower plates 5 and 6 of slightly oval configuration in plan and between which a vertically disposed sleeve 7 extends and projects above the upper plate 5 for a purpose to be presently explained, said sleeve (see FIG. 6) being disposed adjacent to one end of said plates. Projecting from between said plates beyond the ends thereof opposite the sleeve 7 is a hollow rectangular bar 8 in which the drawbar C of the towing vehicle is received. The drawbar and the bar 8 are usually provided with a plurality of transverse holes for optional insertion of a cross pin 9, said pin being secured in any desired manner as, for example, by the self-securing latch pin 10. A pair of reinforcing members 11, 11 are disposed between the plates 5 and 6 and extend divergingly rearwardly away from the bar 8. Pivotally mounted on the sleeve 7 between the plates 5 and 6 is a cylindrical sway reducing head member 12, said head comprising a sleeve surrounding the sleeve 7 and having an integrally formed socket sleeve 13 projecting radially rearwardly therefrom. The parts of the above described head, except the member 12, are preferably welded together into a unitary structure to provide the utmost strength with a minimum of weight.

Removably and vertically adjustably mounted in the inner surface of the sleeve 7 is a tubular shank 14 on the upper end of which is secured the ball head 15 forming an integral part thereof. The tubular shank 14 is provided with a plurality of diametrically opposed pairs of holes 16 placed along the length thereof and the upper end portion of the sleeve 7 which projects beyond the plate 5 is provided with a complementary pair of holes 17 affording means whereby the tubular shank 14 and the ball end thereof may be secured at selected elevations by a pin 18 which may be secured by a latch pin 19 of the same type as the pin 10.

A friction shoe means comprising a metal backing member 20 and a friction producing surface 21 of material such as brake lining is interposed between one of the members 11 and the sway resisting head 12, the friction material being of complementary arcuate configuration. A set screw 22 extending through the adjacent member 11 engages a socket 23 in the metal backing member 20 and thus serves both to hold the member in place and by adjustment to provide a desired amount of friction pressure against the sway resisting head 12. A lock nut 22' may be employed to hold the set screw 22 in adjusted position. Preferably, the head 12 carries a lubrication fitting 24 by which lubricant may be supplied to the bearing of said head on the exterior of the sleeve 7.

The jack component includes a base member 25 comprising an inverted channel member disposed on and transversely of the tongue members D, D. It is disposed in rear of the platform member G which places it in adjacency to the front wall of the trailer body and is secured thereon by separate clamping means each comprising a pair of clamp bolts 26 extending through slots 27 in the member 25 and engaging a cross bar 28 on the under side of the associated tongue member D, the slots serving to accommodate either a selected position longitudinally of the tongue structure or a narrower or wider spacing of the tongue members D on different models of trailers.

At its midlength, the member 25 has a rectangular opening 29 formed in the web portion thereof through which the vertically movable, hollow, rectangular member 30 of the jack component is reciprocable. The member 30 is slidably received in a fixed, hollow, rectangular member 31 mounted on the upper surface of the member 25 by integrally formed flanges 32, 32 thereof secured to the upper surface of the member 25 by bolts 33, 33. The upper end of the member 31 is closed and is provided with a bearing means 34 axially longitudinally aligned with said member and including means for resisting thrust in both directions and the upper end of a screw 35 is received in said bearing means and extends downwardly from said bearing means to engage the threads of a complementary nut element 36 fixed in the upper end of the member 30. Above the bearing means 34, the screw 35 terminates in appropriate means for rotating it as, for example, a crank handle 37. Where the shape of the trailer fails to afford room for the sweep of a handle, the screw may terminate in a hexagonal or square head portion for engagement by a ratchet wrench or the like.

At its lower end, which is below the trailer tongue, the right hand side surface of the member 30 has the upper end of a flat bar 38 welded thereto, said bar thence extending downwardly and at its other end being welded to the upper end of the cylindrical plug member 39 disposed in substantial longitudinal axial alignment with the member 30, the distance between the adjacent end faces of the member 30 and of the cylindrical plug 39 being slightly greater than the diameter of the bar 3 and said end faces together with the adjacent side face of the bar 38 combining to form a notch 40 in which the end of the bar 3 remote from the connector component assembly 1 is received. Means for retaining the bar in said notch comprises a latch bar 41 disposed diametrically opposite the member or bar 38, said latch bar being pivotally mounted at its upper end on a stud 42 projecting from the plug member 39 and retained thereon by a nut 42' and said latch member, at its lower end, having a notch 43 formed in an edge thereof permitting the latch bar to be swung across a stud 44 projecting laterally from the upper end of the member 39 where it may be releasably clamped by a wing nut 45 on said stud.

The forward end of the bar 3 is insertable in the socket sleeve 12 and is detachably secured therein by a removable cross pin 46 extending through complementary holes in the socket sleeve 13 and the end of the bar 3 as indicated respectively at 47 and 48. Preferably, the holes 47 in the walls of the socket portion 13 are disposed diagonally and the head end of the pin 46 is connected by a chain 49 to the outer surface of the socket member to prevent it from becoming lost.

The lower end of the cylindrical member 39 is removably received in the socket portion 50 of a swiveled caster wheel assembly 51 which is employed in supporting the trailer when not connected to the towing vehicle and is also employed in maneuvering the trailer as an incident to coupling it to or uncoupling it from the towing vehicle as will presently be explained. A thumb screw 52 on the socket portion 50 of the caster serves as a securing means. When the trailer has been connected to the towing vehicle this caster wheel unit is removed and is replaced when the trailer is again to be uncoupled.

In use, assuming that the trailer is uncoupled from the towing vehicle and is about to be coupled thereto, at that time, the connector component and bar 3 have been previously removed from the trailer. The bar 3 is removed from the connector component and the connector component is first attached to the drawbar of the towing vehicle with the ball 15 thereof positioned by the crosspin 18 at the elevation at which it has been used previously in connection with that particular trailer. The towing vehicle is then backed up to a point at which the connector element and ball is closely adjacent to the end of the trailer tongue and the trailer is pulled forward and laterally one way or the other until the socket E and latch F are in registry with the ball. As a part of this maneuver, the adjusting screw means of the jack component may be operated to raise the front end of the tongue to bring the socket above the ball and then lowered to bring the socket into contact with the ball and thus allow the latch to complete that connection.

The bar 3 is then inserted in the socket 13 and secured by the crosspin 46 with the head 12 and socket 13 as a unit being rotated slightly clockwise for convenience in inserting the bar 3 in the socket. The bar 3 is then swung counterclockwise and the jack component vertically adjusted, if necessary, so that the distal end of the bar 3 will enter the notch 40 and the latch bar 41 is then closed over it to retain the bar in the notch. When this has been achieved, the screw means of the jack component is operated to cause the member 30 thereof to move upwardly with it carrying the distal end of the bar 3 with it and in effect causing the frame structure of the towing vehicle to tend to move around the rear axle of the vehicle as an axis and thus equalize the distribution of the weight of the trailer imposed on the wheels of the trailer and on the towing vehicle wheels. When this adjustment has been achieved, the caster assembly 51 is removed from the cylindrical body or stud 39 to afford road clearance and is carried in the towing vehicle or in the trailer until again needed.

In use, the friction provided by the friction means 20, 21 and 22 can be adjusted to accommodate side sway experienced when driving in a crosswind. The friction afforded will yieldingly resist the impact of the wind but will be insufficient to adversely affect rotative movement of the head 12 on the sleeve 7 incident to turning corners and the like. Moreover, the vertical adjustment whereby the load on the rear and front wheels of the towing vehicle can be regulated can be readily changed if it is found that for a given trailer load or given driving conditions, some adjustment is necessary.

Uncoupling of the towing vehicle from the trailer generally follows a reversal of the steps above enumerated. The caster assembly 51 is restored to the jack component and the screw means of the jack component is operated to bring the caster in contact with the ground surface, the ball latch is released and the jack component is operated to lift the tongue clear of the connector until ball component. The towing vehicle and trailer are then separated by movement of one or the other, the bar 3 is removed from the two components and the connector component assembly is removed from the vehicle drawbar. If necessary, the trailer is then adjusted into the position in which it is to occupy and the screw means of the jack component are operated to place the floor of the trailer in the longitudinally horizontal attitude.

Thus there has been provided a trailer hitch means which is composed of few parts and which overcomes many of the troubles experienced with prior art trailer hitches such as have been mentioned at the beginning of this specification and while this specification has disclosed a presently preferred embodiment of the invention, the invention is not to be deemed to be limited to the precise details of construction thus shown by way of example.

I claim:

1. In a trailer hitch, a jack component mountable on a trailer tongue at a point thereon adjacent the juncture of the trailer tongue with the front end wall of the trailer body and including a vertically adjustable member having an end projecting below the trailer tongue, a connector component detachably connectable to the drawbar of a towing vehicle, said connector component having concentric mounting means carrying a ball element disposed for detachable engagement wtih a complementary socket means on the trailer tongue and additionally carrying a sleeve member mounted thereon with capacity for oscillatory movement about a vertical axial line substantially coincident with the center of said ball element, a socket extending radially from said sleeve, and a resilient bar having one end seated in said radially extending socket and the other end engaged by said vertically adjustable member of said jack component effective, incident to vertical adjustment of said member while the trailer and towing vehicle are connected by said hitch, to exert equalizing forces tending to distribute the weight of the trailer on the trailer wheels and on the rear and front wheels of the towing vehicle.

2. A trailer hitch as claimed in claim 1 which said connector component includes friction means cooperating with said oscillatable sleeve effective to yieldingly oppose side sway of the trailer while being towed.

3. A trailer hitch as claimed in claim 1 in which said ball element is vertically adjustably mounted on said mounting means of said connector component.

4. A trailer hitch as claimed in claim 1 in which said jack component includes means for securing said jack component to trailer tongues of varying widths and at a position longitudinally of the trailer tongue at which the end of said resilient bar is engaged by said vertically adjustable member.

5. A trailer hitch as claimed in claim 1 in which said side sway resisting means comprises a friction shoe means including a friction producing surface mounted on said connector component and engaging said oscillatable sleeve and screw threaded means carried by said connector component operable to determine the magnitude of frictional engagement of said friction shoe means with said oscillatable sleeve.

6. A trailer hitch as claimed in claim 1 in which said ball element is vertically adjustably mounted on a supporting socket means formed in said connector component, in which said means for supporting said ball for vertical adjustment includes a vertical bore in said connector component, in which said ball includes a shank portion fitting said bore and having a plurality of transverse holes extending therethrough in spaced relation at varying distances from said ball and in which a removable pin extends through a selected one of said transverse holes and a pair of complementary holes in said connector component to position said ball at a selected elevation above said connector component.

7. A trailer hitch as claimed in claim 6 in which said bore in said connector component is formed by a sleeve member forming a part of said connector component, in which said means extending between said components detachably engages a member pivotally mounted on the exterior of said sleeve and in which a friction means carried by said connector component engages a surface on said pivotally mounted member and yieldingly resists movement of said pivotally mounted member about said sleeve.

References Cited

UNITED STATES PATENTS

| 2,543,948 | 3/1951 | Wiedman | 16—44 |
| 2,597,657 | 5/1952 | Mathisen. | |
| 2,638,315 | 5/1953 | Wagner | 254—86 |
| 2,789,834 | 4/1957 | Chism. | |
| 2,793,878 | 5/1957 | Toland. | |
| 3,011,799 | 12/1961 | Lance. | |
| 3,194,584 | 7/1965 | Reese. | |
| 3,284,098 | 11/1966 | Worley. | |
| 3,297,340 | 1/1967 | Rendessy | 280—432 |
| 3,336,051 | 8/1967 | Dale | 280—490 X |
| 3,347,561 | 10/1967 | Hedgepeth. | |
| 3,347,562 | 10/1967 | Bolyard. | |

LEO FRIAGLIA, *Primary Examiner.*

U.S. Cl. X.R.

280—446, 475, 490